US008953198B2

(12) United States Patent
Moritomo

(10) Patent No.: US 8,953,198 B2
(45) Date of Patent: Feb. 10, 2015

(54) COMMUNICATION SYSTEM, COMMUNICATION APPARATUS, AND COMMUNICATION CONTROL METHOD

(75) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 12/991,854

(22) PCT Filed: Jun. 2, 2009

(86) PCT No.: PCT/JP2009/060408
§ 371 (c)(1),
(2), (4) Date: Nov. 9, 2010

(87) PCT Pub. No.: WO2010/001687
PCT Pub. Date: Jan. 7, 2010

(65) Prior Publication Data
US 2011/0058220 A1    Mar. 10, 2011

(30) Foreign Application Priority Data

Jun. 30, 2008   (JP) ................. 2008-171244

(51) Int. Cl.
*G06F 3/12* (2006.01)
*H04N 5/765* (2006.01)
*H04N 1/00* (2006.01)

(52) U.S. Cl.
CPC ........... *H04N 5/765* (2013.01); *H04N 1/00278* (2013.01); *H04N 2201/0015* (2013.01); *H04N 2201/006* (2013.01); *H04N 2201/0084* (2013.01)
USPC .......................................... 358/1.15; 358/434

(58) Field of Classification Search
USPC ...................... 358/1.15, 434; 710/10, 20, 74; 348/207.99, 207.1, 211.1, 211.2; 455/41.2
See application file for complete search history.

(56) References Cited

U.S. PATENT DOCUMENTS

| 7,247,069 B2 * | 7/2007 | Porat ................................. 441/1 |
| 7,333,227 B2 * | 2/2008 | Seto ............................. 358/1.15 |
| 7,720,447 B2 | 5/2010 | Fron ........................... 455/435.1 |
| 7,975,075 B2 * | 7/2011 | Lee et al. ......................... 710/10 |
| 2003/0093675 A1 * | 5/2003 | Hibino et al. .................. 713/168 |
| 2006/0200564 A1 | 9/2006 | Watanabe et al. ............. 709/227 |
| 2006/0246947 A1 | 11/2006 | Fujii et al. ..................... 455/557 |
| 2006/0268744 A1 | 11/2006 | Sakai et al. ................... 370/254 |
| 2007/0011679 A1 * | 1/2007 | Abe .............................. 718/100 |

FOREIGN PATENT DOCUMENTS

| JP | 2004-104512 A | 4/2004 |
| JP | 2004-328289 A | 11/2004 |
| JP | 2005-047253 A | 2/2005 |

* cited by examiner

*Primary Examiner* — Vu B Hang
(74) *Attorney, Agent, or Firm* — Fitzpatrick, Cella, Harper & Scinto

(57) ABSTRACT

In implementing data transfer using noncontact close proximity transfer, the user operability is improved. The invention includes a communication system having a DSC and printer. Each of the DSC and printer includes a noncontact close proximity transfer function unit which executes, when the DSC and printer are located within a communicable range, connection processing for establishing a connection state in a first communication layer, a print image transfer processing unit which executes, when the connection state in the first communication layer is established, authentication processing for checking whether a connection state in a second communication layer has been established, and executes, when authentication fails, connection processing for establishing the connection state in the second communication layer, and a link control unit which transfers data when authentication succeeds or when the connection state in the second communication layer is established.

14 Claims, 11 Drawing Sheets

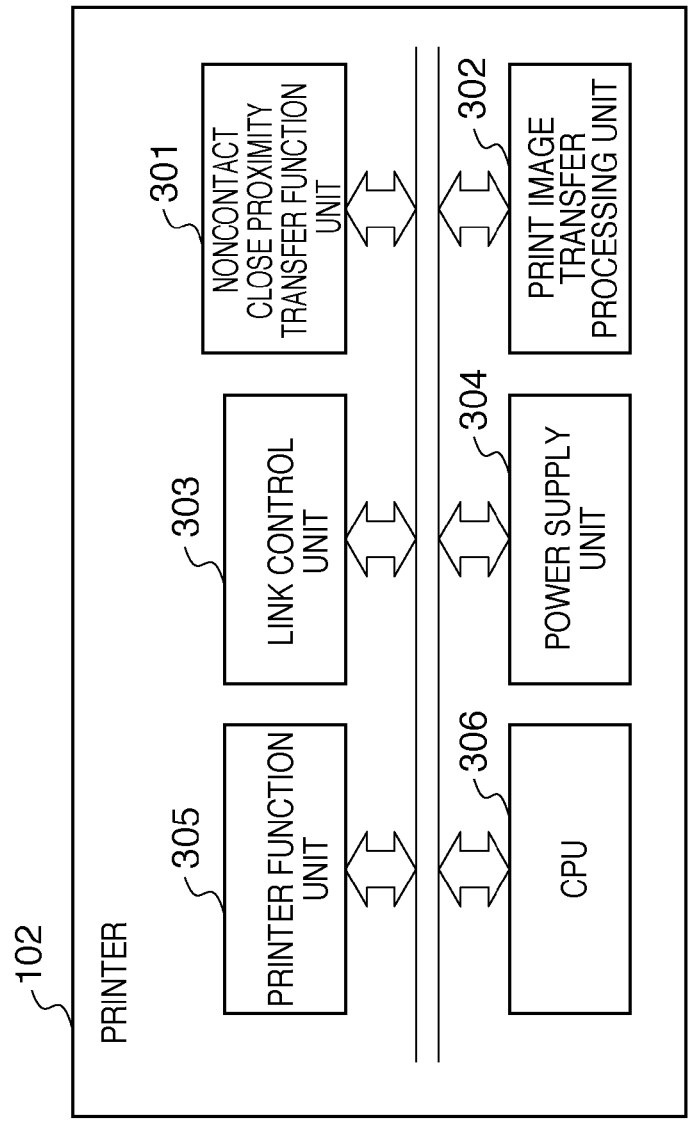

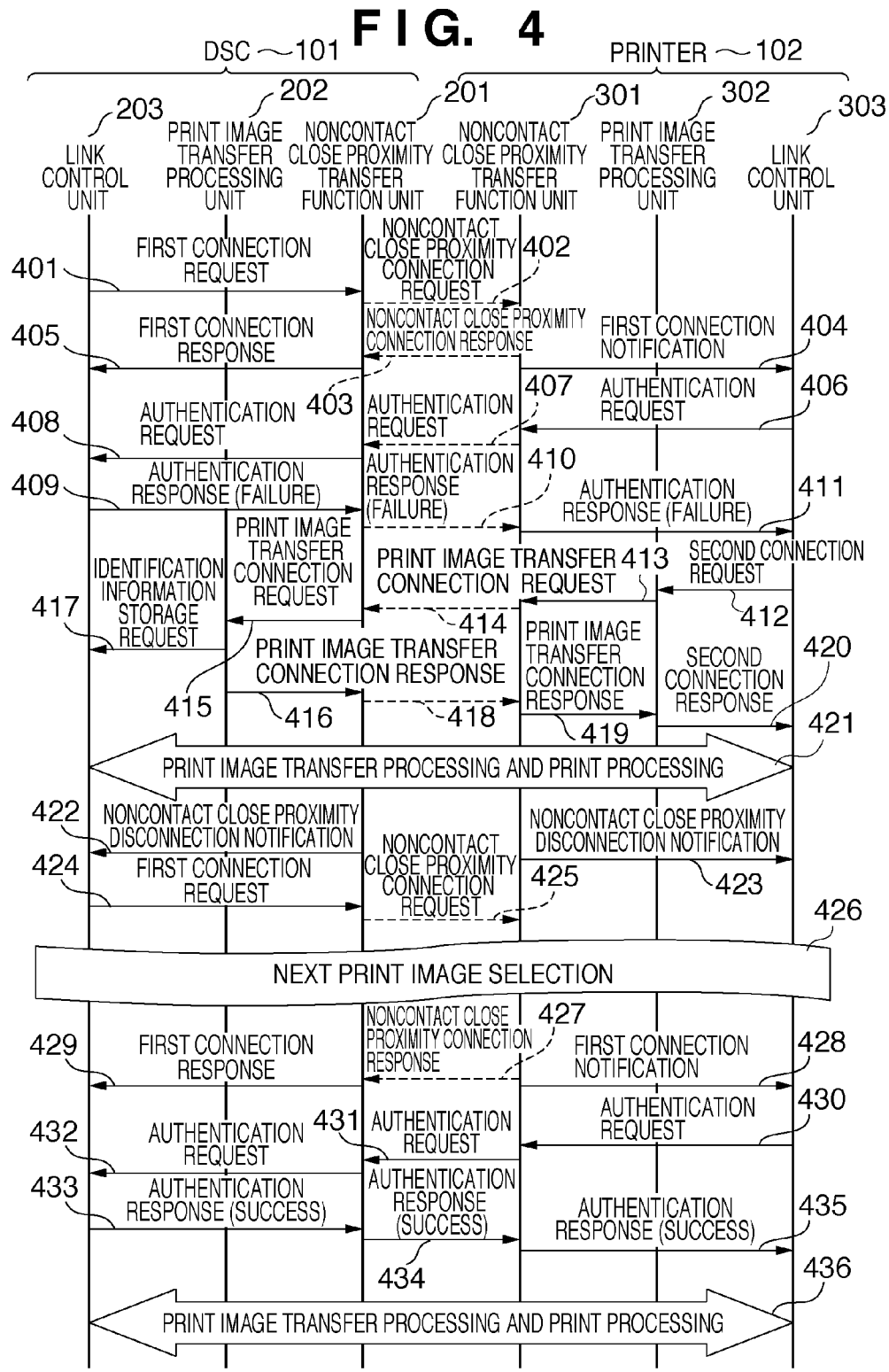

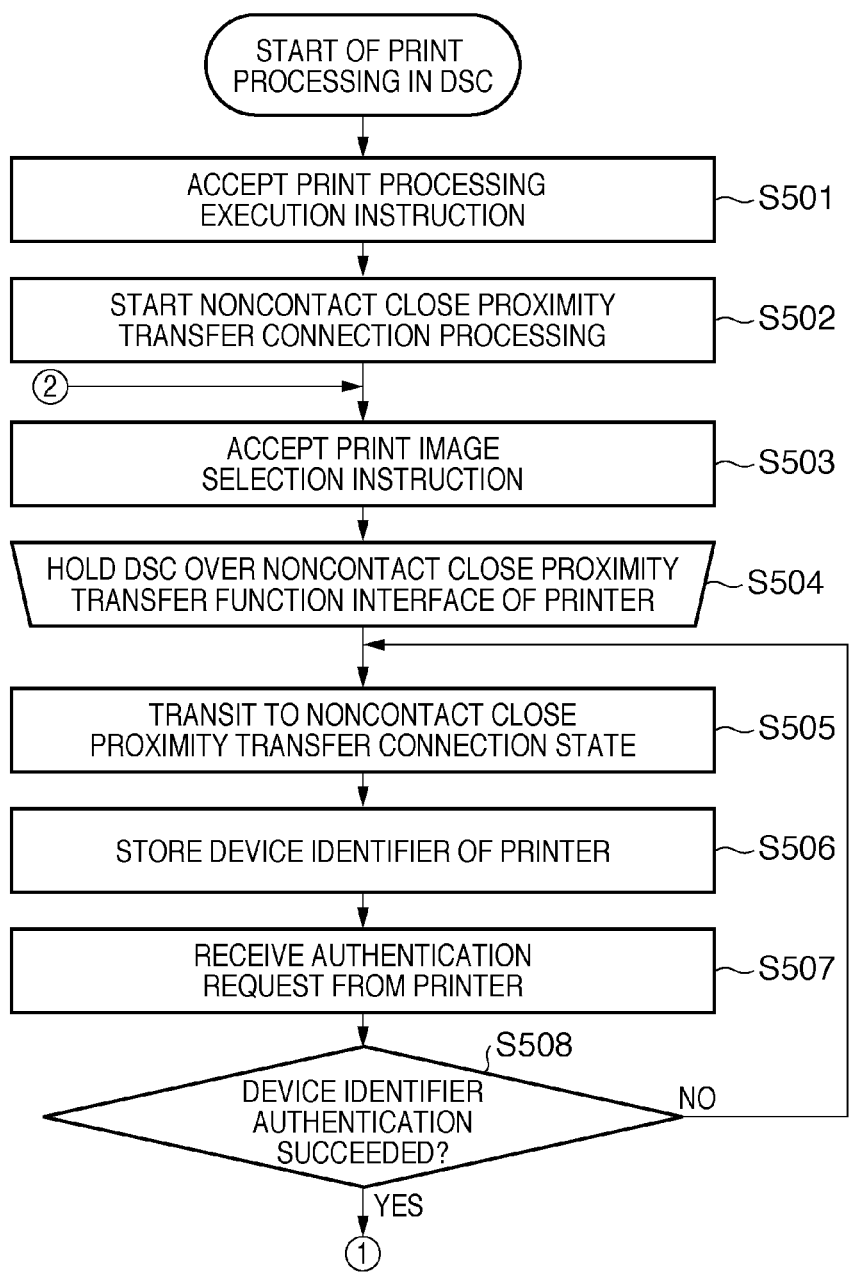

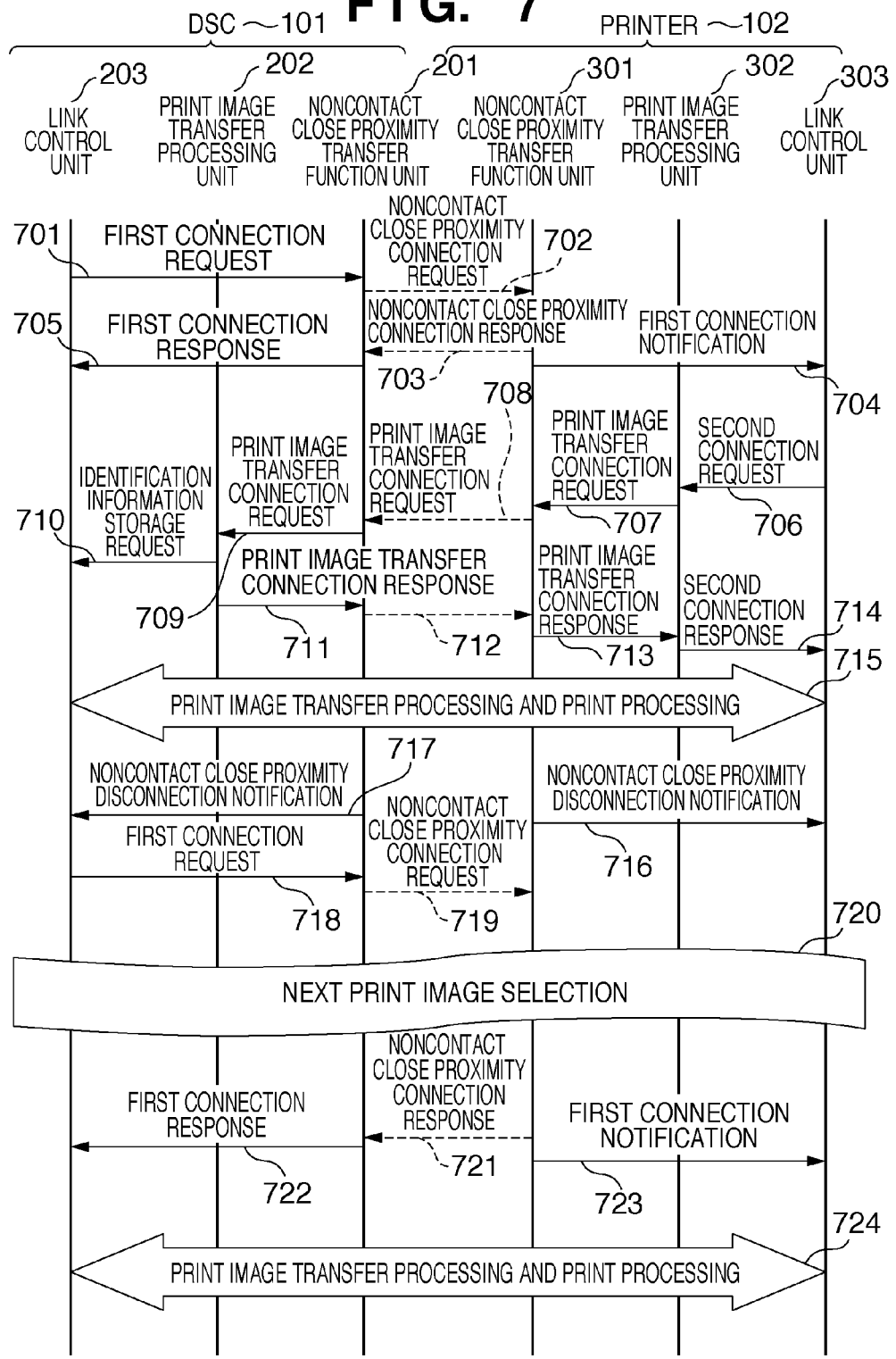

COMMUNICATION SYSTEM, COMMUNICATION APPARATUS, AND COMMUNICATION CONTROL METHOD

TECHNICAL FIELD

The present invention relates to a communication control technique used in noncontact close proximity transfer.

BACKGROUND ART

In recent years, a noncontact close proximity transfer technique has been widely used. As an example, noncontact IC card (to be referred to as an REID (Radio Frequency-Identification) card hereinafter) integrating an REID circuit is available. By taking advantage of easy access between apparatuses, the REID card has been used as, for example, a train ticket.

In the field of such noncontact close proximity transfer technique, although the communication distance is short, studies for increasing the data transfer rate are advancing.

As a communication method for noncontact close proximity transfer, NFC (Near Field Communication) using electromagnetic induction, communication using an induced electric field, and the like are available. Mounting the noncontact close proximity transfer technique on notebook PCs, cellular phones, digital cameras, printers, and the like is expected to simplify data transfer between the apparatuses, and to improve user convenience.

On the other hand, there has been proposed a print image transfer technique such as PictBridge as a technique of implementing print processing by directly connecting a digital camera (to be referred to as a DSC hereinafter) and a printer, and inputting a print instruction on a display device generally provided for the DSC.

In a DSC and printer adopting the print image transfer technique, when the DSC is connected to the printer, it is possible to use the display device of the DSC as a means for inputting various instructions including, in particular, an instruction to select an image to be printed. This eliminates the need for providing, for the printer side, a dedicated display device to check an image to be printed, thereby achieving cost reduction of the printer.

It is possible to print an image included in the DSC with easier operation by combining those techniques (noncontact close proximity transfer technique and print image transfer technique). More particularly, when the digital camera and printer each having a noncontact close proximity transfer function are only brought close to each other, the print image transfer protocols of both the apparatuses are activated, thereby printing a desired image.

In contrast, in the case of such easy operation, the user is assumed to often bring the digital camera and printer into contact with each other and move them away from each other. It is, therefore, assumed that management of connection/disconnection of the protocol using the noncontact close proximity transfer technique and the print image transfer protocol becomes more complicated.

Note that Japanese Patent Laid-Open No. 2004-104512 discloses a configuration which measures the duration of the disconnection state of an IEEE802.11 wireless LAN protocol, and switches higher protocols of the wireless LAN protocol to a disconnection state based on the measured duration.

In the case of noncontact close proximity transfer, however, connection/disconnection often occurs in contrast to conventional wireless communication. It is, therefore, assumed that the following problems arise if the technique disclosed in Japanese Patent Laid-Open No. 2004-104512 is directly applied to the noncontact close proximity transfer protocol and print image transfer protocol.

For example, to transfer an image within a DSC by noncontact close proximity transfer to a printer and print it, the user selects, on the DSC, the image to be printed, and then brings the DSC close to the printer, thereby transferring the selected image to the printer and causing the printer to print it. Furthermore, to successively print another image, the user moves the DSC away from the printer to select the next image. At this time, the noncontact close proximity transfer protocol enters a "disconnection" state.

Note that the time required by the user to select an image differs depending on the user or the number of images as selection targets. For example, if the user is unfamiliar with the operation or if the number of images as selection targets is large, it takes time to select an image.

That is, the duration of the disconnection state of the noncontact close proximity transfer protocol due to image selection is variable. If, therefore, whether to switch the print image transfer protocol to a disconnection state is determined based on the duration of the disconnection state of the noncontact close proximity transfer protocol, the print image transfer protocol may or may not enter the disconnection state when selecting an image to be printed. That is, it may be necessary or unnecessary to execute connection processing by the print image transfer protocol.

The time required to execute the connection processing by the print image transfer protocol has a direct influence on a print processing time. Therefore, the print processing time may be long or short, thereby deteriorating user operability.

DISCLOSURE OF INVENTION

The present invention has been made in consideration of the above problems.

A communication system according to the present invention has the following configuration. That is, a communication system including first and second communication apparatuses that perform communication via communication interfaces, wherein each of the first and second communication apparatuses comprises a first connection unit configured to execute, when the communication interfaces are located within a communicable range, connection processing for establishing a connection state in a first communication layer between the first and second communication apparatuses, an authentication unit configured to execute, when the connection state in the first communication layer is established by the connection processing executed by the first connection unit, authentication processing for checking whether a connection state in a second communication layer has been established between the first and second communication apparatuses, a second connection unit configured to execute, when the connection state in the second communication layer has not been established between said first and second communication apparatuses as a result of the authentication processing, connection processing for establishing the connection state in the second communication layer, and a transfer unit configured to transfer data between the first and second communication apparatuses when the connection state in the second communication layer has been established between said first and second communication apparatuses as a result of the authentication processing or when the connection state in the second communication layer is established by the second connection unit.

According to the present invention, it is possible to improve user operability by utilizing an existing transfer protocol in noncontact close proximity transfer when implementing data transfer by the noncontact close proximity transfer.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a block diagram showing the functional arrangement of a communication apparatus (printer 102) according to the embodiment of the present invention;

FIG. 4 is a sequence chart showing the sequence of print processing in a communication system according to the first embodiment of the present invention;

FIGS. 5A and 5B are flowcharts showing a processing sequence in a DSC 101 when executing the print processing in the communication system according to the first embodiment of the present invention;

FIG. 7 is a sequence chart showing the sequence of print processing in a communication system according to the second embodiment of the present invention;

BEST MODE FOR CARRYING OUT THE INVENTION

Embodiments of the present invention will be described below with reference to the accompanying drawings.

First Embodiment

Embodiments of the present invention will now be explained in accordance with the accompanying drawings. Note that a communication apparatus described in the following embodiments has a noncontact close proximity transfer function unit and a print image transfer function unit. The communication apparatus also has a link control unit to efficiently use the protocol of the print image transfer function unit operating in noncontact close proximity transfer even when the noncontact close proximity transfer function unit repeatedly performs connection/disconnection.

In the following embodiments, as the communication apparatuses, a DSC (first communication apparatus) having a noncontact close proximity transfer function unit and a print image transfer function unit and a printer (second communication apparatus) having the same functions are arranged.

In a communication system including the DSC and printer, it is possible to print an image within the DSC by the printer only by holding the DSC over the printer. It is possible to efficiently perform print processing even when processing of selecting/printing an image is repeated several times.

<Configuration of Noncontact Communication System>

Figure 1:
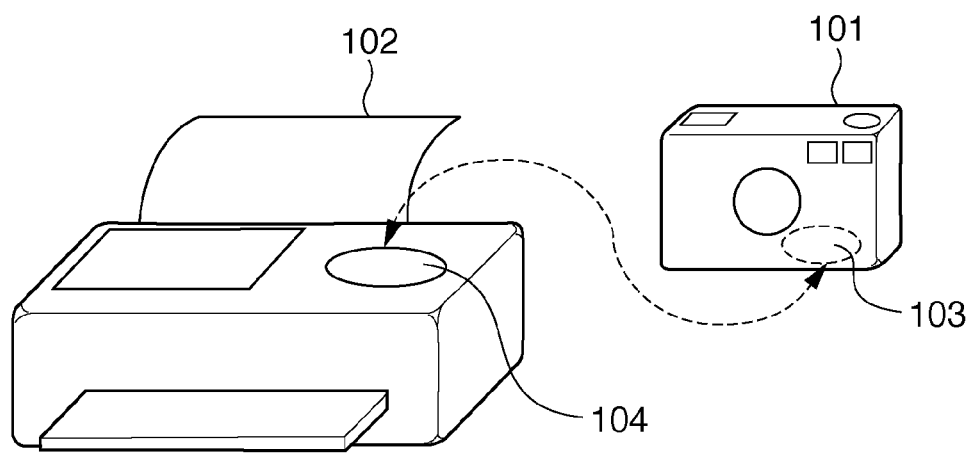
FIG. 1 is a view showing a configuration example of a communication system according to an embodiment of the present invention.

FIG. 1 is a view showing a configuration example of a communication system according to an embodiment of the present invention. Referring to FIG. 1, a DSC 101 serves as a digital camera (to be referred to as a DSC hereinafter) having a "noncontact close proximity transfer" function. The "noncontact close proximity transfer" function of the DSC 101 functions as a transfer means for transferring image data saved in the DSC to, for example, a printer having the same "noncontact close proximity transfer" function.

A noncontact close proximity transfer function interface 103 serves as a communication interface for implementing noncontact close proximity transfer in the DSC 101.

A noncontact close proximity transfer function interface 104 serves as a communication interface for implementing noncontact close proximity transfer in a printer 102.

The printer 102 has the same "noncontact close proximity transfer" function as the DSC 101. The "noncontact close proximity transfer" function of the printer 102 also functions as an image data transfer means, similarly to the DSC 101.

<Functional Arrangement of DSC>

Figure 2:
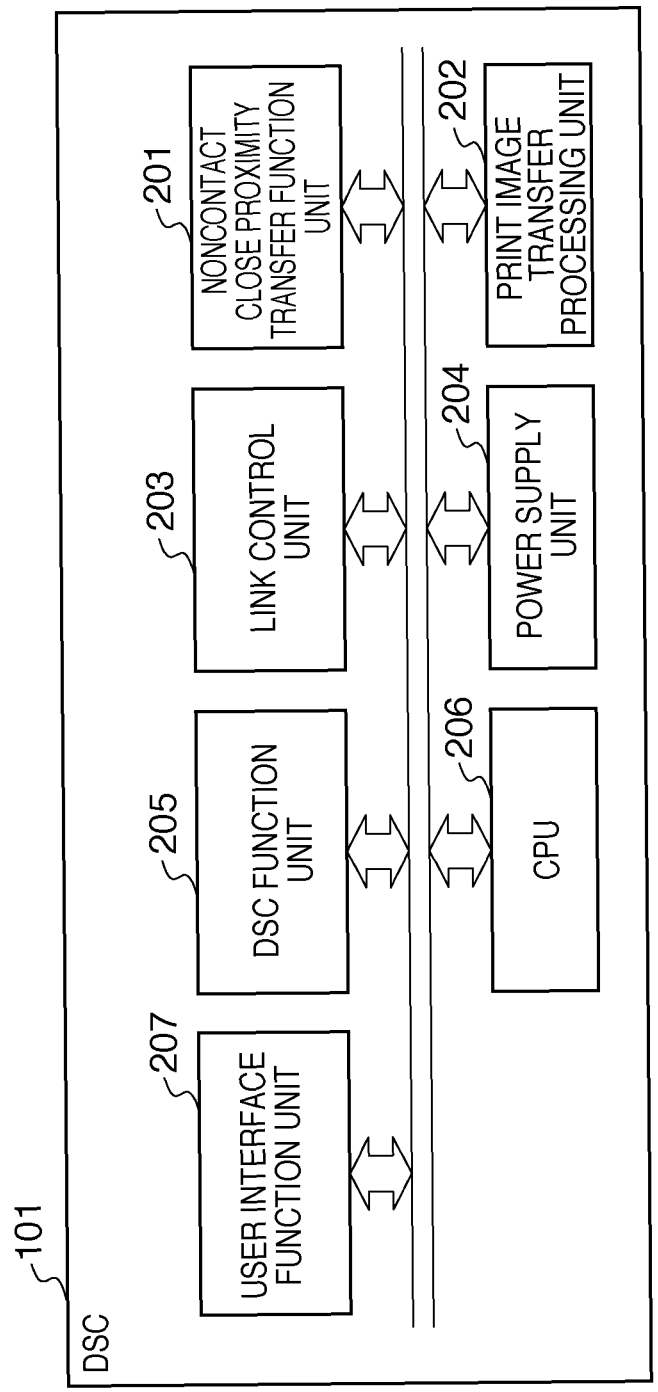
FIG. 2 is a block diagram showing the functional arrangement of a communication apparatus (DSC 101) according to the embodiment of the present invention.

The arrangement of the DSC 101 will be described next. FIG. 2 is a block diagram showing the functional arrangement of the communication apparatus (DSC 101) according to the embodiment of the present invention.

Referring to FIG. 2, a noncontact close proximity transfer function unit (first connection means) 201 is a block for implementing data transfer with another apparatus having a noncontact close proximity transfer function.

When a print instruction is input at the DSC 101, a print image transfer processing unit (second connection means) 202 transfers image data within the DSC 101 from the DSC 101 to the printer 102. The unit 202 controls data transfer processing for implementing print processing in the printer 102.

A link control unit 203 controls a protocol which processes noncontact close proximity transfer and that which processes print image transfer. More particularly, the unit 203 stores a print image transfer connection identifier for identifying the connection state of the protocol which processes print image transfer. Furthermore, the unit 203 compares the stored print image transfer connection identifier and a print image transfer connection identifier transferred from another communication apparatus. The unit 203 also stores the device identifier of another communication apparatus. The unit 203 compares the stored device identifier and a device identifier transferred from another communication apparatus. The unit 203 controls, based on comparison results, the connection state of the protocol which processes print image transfer.

A power supply unit 204 supplies driving power to each block which needs power supply.

A CPU 206 is a block for instructing and controlling the above operation.

A DSC function unit 205 executes the processing of the DSC, such as processing of capturing an image to generate image data.

A user interface function unit 207 controls a display device which accepts a print instruction from the user, a button dedicated to print processing, and the like.

<Functional Arrangement of Printer>

The arrangement of the printer 102 will be described next. FIG. 3 is a block diagram showing the functional arrangement of the communication apparatus (printer 102) according to the embodiment of the present invention.

A noncontact close proximity transfer function unit (first connection means) 301 is a block which has the same function as the noncontact close proximity transfer function unit 201 of the DSC 101, and implements data transfer with another communication apparatus having a noncontact close proximity transfer function.

A print image transfer processing unit (second connection means) 302 controls data transfer processing of causing the DSC 101 to transfer image data within the DSC 101 when a print instruction is input at the DSC 101.

A link control unit 303 controls a protocol which processes noncontact close proximity transfer and that which processes print image transfer. More specifically, when connection by the noncontact close proximity transfer function is established, the unit 303 stores the device identifier of another communication apparatus.

The link control unit 303 also stores a print image transfer connection identifier for identifying the connection state of the protocol which processes print image transfer. Furthermore, the unit 303 activates authentication processing for authenticating another communication apparatus. In the authentication processing, the unit 303 transmits, to the other communication apparatus, an authentication request containing the stored print image transfer connection identifier and device identifier, and stands by for reception of a response. Based on response contents, the unit 303 controls the connection state of the protocol which processes print image transfer.

A power supply unit 304 supplies electric power to each block which needs power supply.

A CPU 306 is a block for instructing and controlling the operation of the above blocks.

A printer function unit 305 is a block of executing the processing of the printer such as processing of printing a transferred image.

<Sequence of Print Processing in Communication System>

The sequence of print processing in the communication system shown in FIG. 1 will now be explained. To print data using the communication system shown in FIG. 1, the user selects an image saved in the DSC 101, and then holds the DSC 101 over the printer 102, thereby transferring the selected image to the printer 102 and causing the printer 102 to print it. When user prints a plurality of images, he/she successively performs the above operation.

Figure 5B:
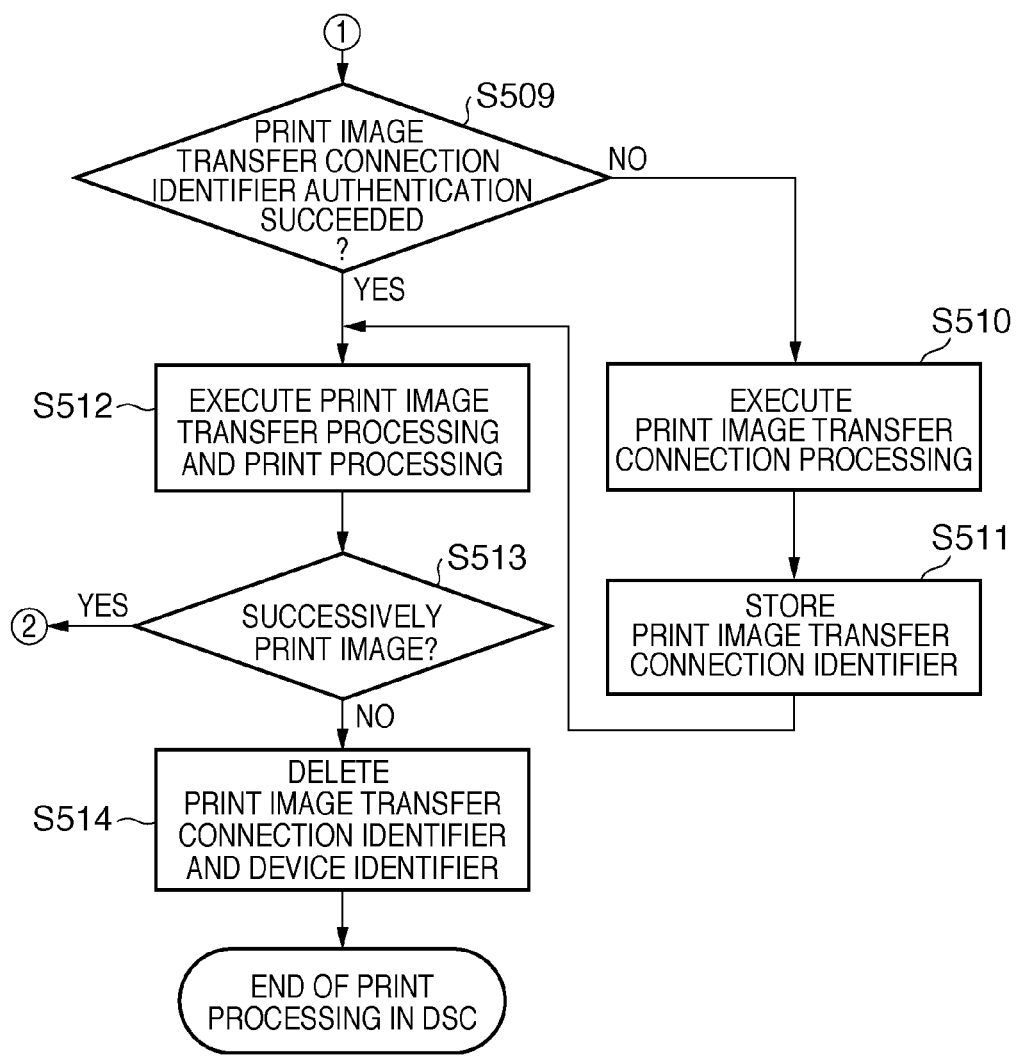
Figure 6:
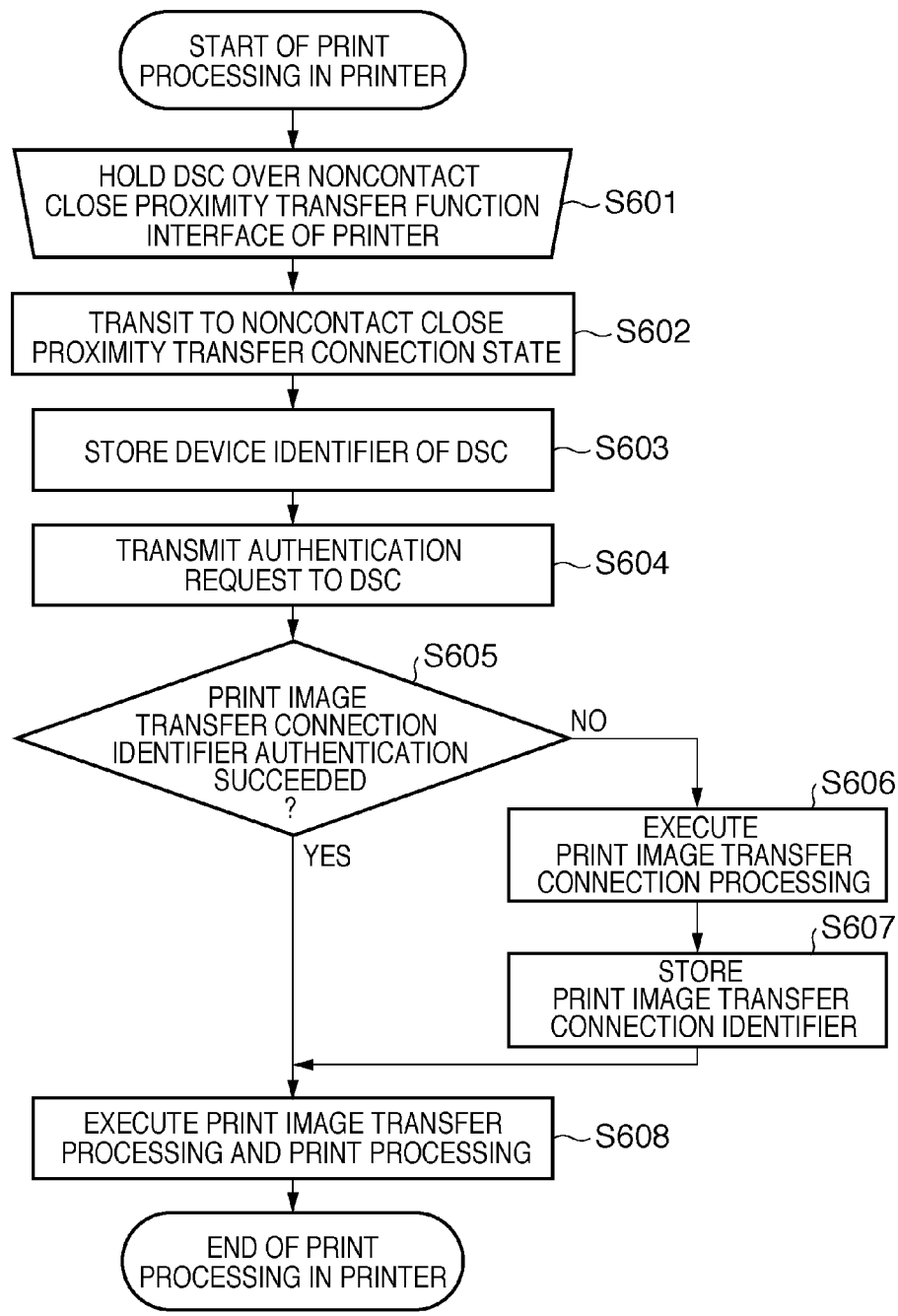
FIG. 6 is a flowchart showing a processing sequence in a printer 102 when executing the print processing in the communication system according to the first embodiment of the present invention.

The sequence of the print processing in the communication system when the user performs such operation will be described below with reference to FIGS. 4 to 6. FIG. 4 is a sequence chart showing the sequence of the print processing in the communication system. FIGS. 5A and 5B are flowcharts showing a processing sequence in the DSC 101 when executing the print processing in the communication system. FIG. 6 is a flowchart showing a processing sequence in the printer 102 when executing the print processing in the communication system.

When the user powers on the DSC 101 and printer 102, and inputs a print processing execution instruction either via the display device of the user interface function unit 207 or using a button dedicated to print processing, the DSC 101 accepts the instruction (step S501).

Upon accepting the print processing execution instruction in step S501, the DSC 101 starts noncontact close proximity transfer connection processing in step S502.

More specifically, the link control unit 203 issues, to the noncontact close proximity transfer function unit 201, a "first connection request" (401) to perform connection using the noncontact close proximity transfer function. Upon reception of the request, the noncontact close proximity transfer function unit 201 transmits a "noncontact close proximity connection request" (402) to the printer 102.

In this state, the user selects an image to print from a plurality of images saved in the DSC 101. The DSC 101 accepts a print image selection instruction input by the user (step S503).

Subsequently, the user holds the DSC 101 over the printer 102 so that the noncontact close proximity transfer function interface 103 comes into contact with the noncontact close proximity transfer function interface 104 or the apparatuses are located within a communicable range (steps S504 and S601).

With this operation, the printer 102 can receive the "noncontact close proximity connection request" (402) from the DSC 101.

In the printer 102, the noncontact close proximity transfer function unit 301 receives the "noncontact close proximity connection request" (402). This causes the printer 102 to transit to a noncontact close proximity transfer connection state (a connection state in the first communication layer) (step S602).

More specifically, the noncontact close proximity transfer function unit 301 executes noncontact close proximity transfer connection processing, and then transmits, to the DSC 101, a "noncontact close proximity connection response" (403) representing that the connection processing has been completed. The unit 301 also notifies, as a "first connection notification" (404), the link control unit 303 that the connection processing has been completed.

Since the printer 102 can recognize the device identifier of the DSC 101, each of the "first connection request" (401) and the "noncontact close proximity connection request" (402) contains the device identifier of the DSC 101.

When, therefore, the printer 102 receives the "noncontact close proximity connection request" (402), the link control unit 303 stores the device identifier of the DSC 101 (step S603).

Meanwhile, in the DSC 101, the noncontact close proximity transfer function unit 201 receives the "noncontact close proximity connection response" (403). The DSC 101, therefore, detects that the noncontact close proximity transfer connection processing has been completed, and transits to a noncontact close proximity transfer connection state (step S505).

Furthermore, the noncontact close proximity transfer function unit 201 transmits, to the link control unit 203, a "first connection response" (405) representing that the connection processing has been completed.

Since the DSC 101 can recognize the device identifier of the printer 102, each of the "noncontact close proximity connection response" (403) and the "first connection response" (405) contains the device identifier of the printer 102.

Therefore, when the DSC 101 receives the "noncontact close proximity connection response" (403), the link control unit 203 stores the device identifier of the printer 102 via the "first connection response" (405) (step S506). An authentication means (to be described later) uses the device identifier of the opposing apparatus, which has been stored as explained above.

Then, transmission/reception processing between the DSC 101 and the printer 102 is executed via the noncontact close proximity transfer function units 201 and 301.

Upon reception of the "first connection notification" (404), the link control unit 303 of the printer 102 advances the process to step S604. In step S604, the link control unit 303 transmits, to the DSC 101, an "authentication request" (406) to check a connection state (a connection state in the second communication layer) in the protocol for the print image transfer processing.

Assume that the "authentication request" (406) contains the device identifier of the printer 102. Assume also that the "authentication request" (406) contains a unique identifier (print image transfer connection identifier) associated with the connection state in the protocol for the print image transfer processing.

At this stage, the printer 102 has never executed print processing of an image transferred from the DSC 101 since power on. Therefore, the link control unit 303 stores no print image transfer connection identifier, and the "authentication request" (406) to be transmitted by the link control unit 303 contains no print image transfer connection identifier at this time. Likewise, based on the "authentication request" (406) transmitted by the link control unit 303, an "authentication request" (407) to be transmitted by the noncontact close proximity transfer function unit 301 contains no print image transfer connection identifier.

In step S507, the noncontact close proximity transfer function unit 201 of the DSC 101 receives the "authentication request" (407), and the link control unit 203 performs device identifier comparison processing.

Since the device identifier of the printer 102 has been received via the "noncontact close proximity connection response" (403), and stored in the link control unit 203, the comparison processing (authentication) succeeds (YES in step S508). If the comparison processing (authentication) fails (NO in step S508), the process returns to step S505 to repeat the processing from the noncontact close proximity transfer connection processing.

After that, in step S509, the DSC 101 executes print image transfer connection identifier comparison processing, and determines whether the comparison processing (authentication) has succeeded.

At this stage, the DSC 101 has never transferred an image to the printer 102 for the print processing since power on, similarly to the printer 102. The link control unit 203, therefore, stores no unique identifier (print image transfer connection identifier) associated with a connection state in the protocol for the print image transfer processing.

That is, both the printer 102 and DSC 101 store no print image transfer connection identifier. The link control unit 203 of the DSC 101 responds to an "authentication request" (408) with an "authentication response (failure)" (409) representing that authentication has failed.

The noncontact close proximity transfer function unit 201 transmits an "authentication response (failure)" (410) to the noncontact close proximity transfer function unit 301 of the printer 102. The noncontact close proximity transfer function unit 301 transmits an "authentication response (failure)" (411) to the link control unit 303.

In step S605, the link control unit 303 determines whether the print image transfer connection identifier authentication has succeeded. In this example, since the link control unit 303 has received the "authentication response (failure)" (411), it determines that the print image transfer connection identifier authentication has failed, and grasps that the connection processing by the protocol for the print image transfer processing has not been done at this time.

To start the connection processing by the protocol for the print image transfer processing, the link control unit 303 of the printer 102 issues a "second connection request" (412) to the print image transfer processing unit 302.

Upon receiving the "second connection request" (412), the print image transfer processing unit 302 of the printer 102 transmits a "print image transfer connection request" (413) in step S606.

In response to this, the noncontact close proximity transfer function unit 301 transmits a "print image transfer connection request" (414). The noncontact close proximity transfer function unit 201 of the DSC 101 transmits a "print image transfer connection request" (415) to the print image transfer processing unit 202.

Upon receiving the "print image transfer connection request" (415), the print image transfer processing unit 202 of the DSC 101 executes the connection processing by the protocol for the print image transfer processing in step S510, and then transmits a "print image transfer response" (416) representing that the connection processing has been completed.

Furthermore, the noncontact close proximity transfer function unit 201 transmits a "print image transfer connection response" (418). The noncontact close proximity transfer function unit 301 transmits a "print image transfer connection response" (419) to the print image transfer processing unit 302.

When the print image transfer processing unit 302 of the printer 102 receives the "print image transfer connection response" (419), the connection processing by the protocol for the print image transfer processing is complete. At this time, the DSC 101 can transfer an image to the printer 102, and cause the printer 102 to execute print processing.

In this case, the DSC 101 and the printer 102 generate a unique identifier (print image transfer connection identifier) associated with connection in the protocol for the print image transfer processing, and share it with each other. In this example, assume that when the print image transfer processing unit 302 of the printer 102 transmits the "print image transfer connection request" (413), a print image transfer connection identifier is generated.

The generated print image transfer connection identifier is contained in the "print image transfer connection request" (414 or 415), and is sent to the print image transfer processing unit 202 of the DSC 101. When executing the connection processing by the protocol of the print image transfer processing, the print image transfer processing unit 202 of the DSC 101 issues an "identification information storage request" (417) to the link control unit 203.

In step S511, the link control unit 203 stores the print image transfer connection identifier.

On the other hand, upon receiving the "print image transfer connection response" (419), the print image transfer processing unit 302 of the printer 102 issues a "second connection response" (420) to the link control unit 303.

In step S607, the link control unit 303 stores the print image transfer connection identifier.

A method of generating and storing a print image transfer identifier is not limited to the above method. For example, the link control unit 303 of the printer 102 may receive a "print image transfer connection response". Upon receiving the "print image transfer connection response", the link control unit 303 of the printer 102 may generate a print image transfer connection identifier, and transmit it to the DSC 101.

After that, the print image transfer processing units 202 and 302 of the DSC 101 and printer 102 execute transfer processing of a predetermined print image, and the printer function unit 305 of the printer 102 performs print processing (421; steps S512 and S608).

When the DSC 101 transfers an image to the printer 102, and the printer 102 completes print processing of the transferred image, the DSC 101 determines in step S513 whether to successively execute transfer/print processing on another image.

In this example, a case in which the DSC 101 successively executes transfer/print processing on another image (YES in step S513) will be explained.

To execute transfer/print processing on another image, the user moves the DSC 101 away from the printer 102 to select the other image in the DSC 101. At this time, the DSC 101 and printer 102 transit to a noncontact close proximity transfer disconnection state, and the noncontact close proximity transfer function units 201 and 301 transmit noncontact close proximity disconnection notifications (422 and 423) to the link control units 203 and 303, respectively.

In response to this, the link control unit 203 of the DSC 101 issues, to the noncontact close proximity transfer function unit 201, a "first connection request" (424) to perform connection using the noncontact close proximity transfer function. Upon reception of the request, the noncontact close proximity transfer function unit 201 transmits a "noncontact close proximity connection request" (425) to the printer 102.

In this state, the user selects, from the plurality of images saved within the DSC 101, another image which he/she wants to print (426; step S503).

Note that the protocol for the print image transfer processing is in a connection state at this time, and it does not transit to a disconnection state.

After that, the DSC 101 and printer 102 execute the same processing as the above one (steps S504 to S506 and steps S601 to S603), thereby transiting to a noncontact close proximity transfer connection state.

With this processing, the noncontact close proximity transfer function unit 301 notifies, as a "first connection notification" (428), the link control unit 303 that the connection processing has been completed. The noncontact close proximity transfer function unit 201 transmits, to the link control unit 203, a "first connection response" (429) representing that the connection processing has been completed.

Then, transmission/reception processing between the DSC 101 and the printer 102 is executed via the noncontact close proximity transfer function units 201 and 301.

In step S604, the link control unit 303 of the printer 102 which has received the "first connection notification" (428) transmits, to the DSC 101, an "authentication request" (430) to check the connection state in the protocol for the print image transfer processing.

Assume that the "authentication request" (430) contains the device identifier of the printer 102. Assume also that the "authentication request" (430) contains a unique identifier (print image transfer connection identifier) associated with the connection state in the protocol for the print image transfer processing.

In this state, the printer 102 has already executed the print processing on the image transferred from the DSC 101. That is, the link control unit 303 stores the same print image transfer connection identifier as that in the DSC 101. For this reason, the "authentication request" (430) transmitted by the link control unit 303 in step S604 contains the print image transfer connection identifier.

In step S507, the noncontact close proximity transfer function unit 201 of the DSC 101 receives an "authentication request" (431), and the link control unit 203 performs device identifier comparison processing.

In this case, since the DSC 101 has received the device identifier of the printer 102 via a "noncontact close proximity connection response" (427), and the link control unit 203 stores it, the comparison processing (authentication) succeeds (YES in step S508). If the comparison processing (authentication) fails (NO in step S508), the process returns to step S505 to repeat the processing from the noncontact close proximity transfer connection processing.

Subsequently, in step S509, the DSC 101 executes print image transfer connection identifier comparison processing, and then determines whether the comparison processing (authentication) has succeeded.

At this time, the DSC 101 has already transferred, to the printer 102, the image to undergo print processing. That is, the link control unit 203 stores the same print image transfer connection identifier as that in the printer 102.

In step S509, therefore, the DSC 101 determines that the print image transfer connection identifier comparison processing has succeeded. The link control unit 203 of the DSC 101 responds to an "authentication request" (432) with an "authentication response (success)" (433) representing that the authentication has succeeded.

Furthermore, the noncontact close proximity transfer function unit 201 transmits an "authentication response (success)" (434) to the noncontact close proximity transfer function unit 301 of the printer 102. The noncontact close proximity transfer function unit 301 transmits an "authentication response (success)" (435) to the link control unit 303.

When the link control unit 303 of the printer 102 receives the "authentication response (success)" (434), the printer 102 grasps in step S605 that the DSC 101 and printer 102 are in a connection state in the protocol for the print image transfer processing at this time.

The link control unit 303 of the printer 102, therefore, need not start the connection processing by the protocol for the print image transfer processing.

The DSC 101 can transfer an image to the printer 102, and cause the printer 102 to execute print processing. Therefore, the print image transfer processing units 202 and 302 of the DSC 101 and printer 102 execute transfer processing of a predetermined print image, and the printer function unit 305 of the printer 102 performs print processing (436; steps S512 and S608).

After that, when the DSC 101 successively transfers an image saved in itself to the printer 102, and causes the printer 102 to print it, the same operation is repeated.

Although the print image transfer connection identifier authentication is done after device identifier authentication is performed in the above description, the order of authentication is not limited to this. The device identifier authentication may be done after the print image transfer connection identifier authentication is executed.

Both the device identifier authentication and the print image transfer connection identifier authentication are done in the above explanation but the present invention is not limited. It is possible to obtain the same effects even if either the device identifier authentication or the print image transfer connection identifier authentication alone is executed.

Although the DSC 101 performs authentication in the above description, the present invention is not limited to this. The printer 102 may execute authentication.

If, in step S513, the DSC 101 determines not to successively execute print processing, the process advances to step S514. In step S514, the DSC 101 deletes the print image transfer connection identifier and the device identifier of the printer 102 which are stored in the DSC 101.

A case in which the DSC 101 determines not to successively execute print processing indicates, for example, a case in which the DSC 101 is powered off, or a case in which the user performs no operation for a certain period of time and then the DSC 101 transits to a power saving state.

Assume that the printer 102 continuously stores the print image transfer connection identifier and the device identifier of the DSC 101, and then updates them upon receiving a connection request from a DSC other than the DSC 101.

As is apparent from the above explanation, in the DSC and printer according to this embodiment, when the print image transfer protocol is in a connection state and the noncontact close proximity transfer unit enters a disconnection state, the print image transfer protocol does not transit to a disconnection state.

For this reason, if the noncontact close proximity transfer unit enters a connection state, it is possible to immediately execute transfer/print processing since authentication can be done by using the already stored print image transfer connection identifier.

That is, the execution time of reconnection processing by the print image transfer protocol is saved to shorten a print processing time, thereby improving user operability.

Although a case in which the present invention is applied to noncontact close proximity transfer has been explained in this embodiment, the present invention is not limited to this. For example, it can be expected to obtain the same effects even if the present invention is applied to another wireless communication such as a wireless LAN.

Second Embodiment

In the above first embodiment, authentication is done by comparing both the print image transfer connection identifiers and the device identifiers after transiting to a noncontact close proximity transfer connection state. The present invention, however, is not limited to this. In this embodiment, a case in which only device identifier authentication is performed will be described.

Figure 8A:
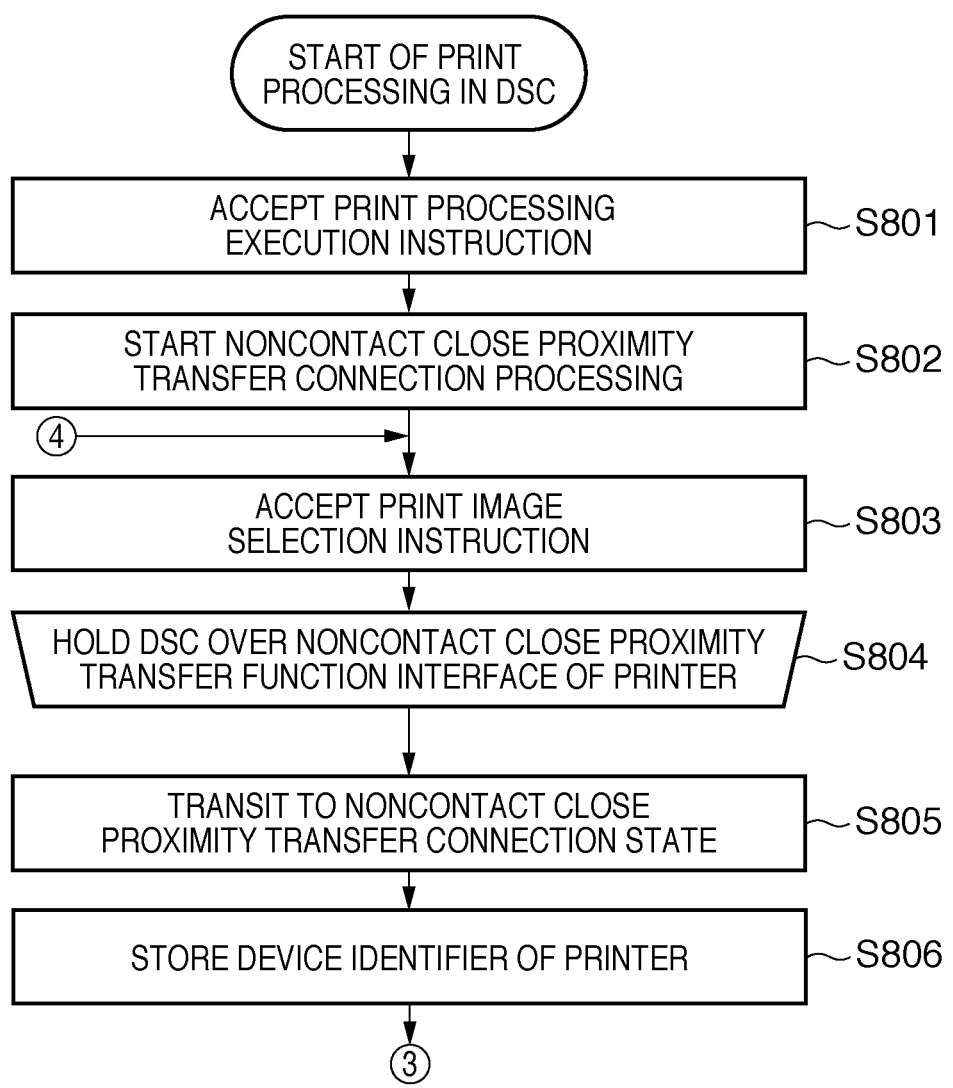
FIGS. 8A and 8B are flowcharts showing processing sequence in a DSC 101 when executing the print processing in the communication system according to the second embodiment of the present invention.
Figure 8B:
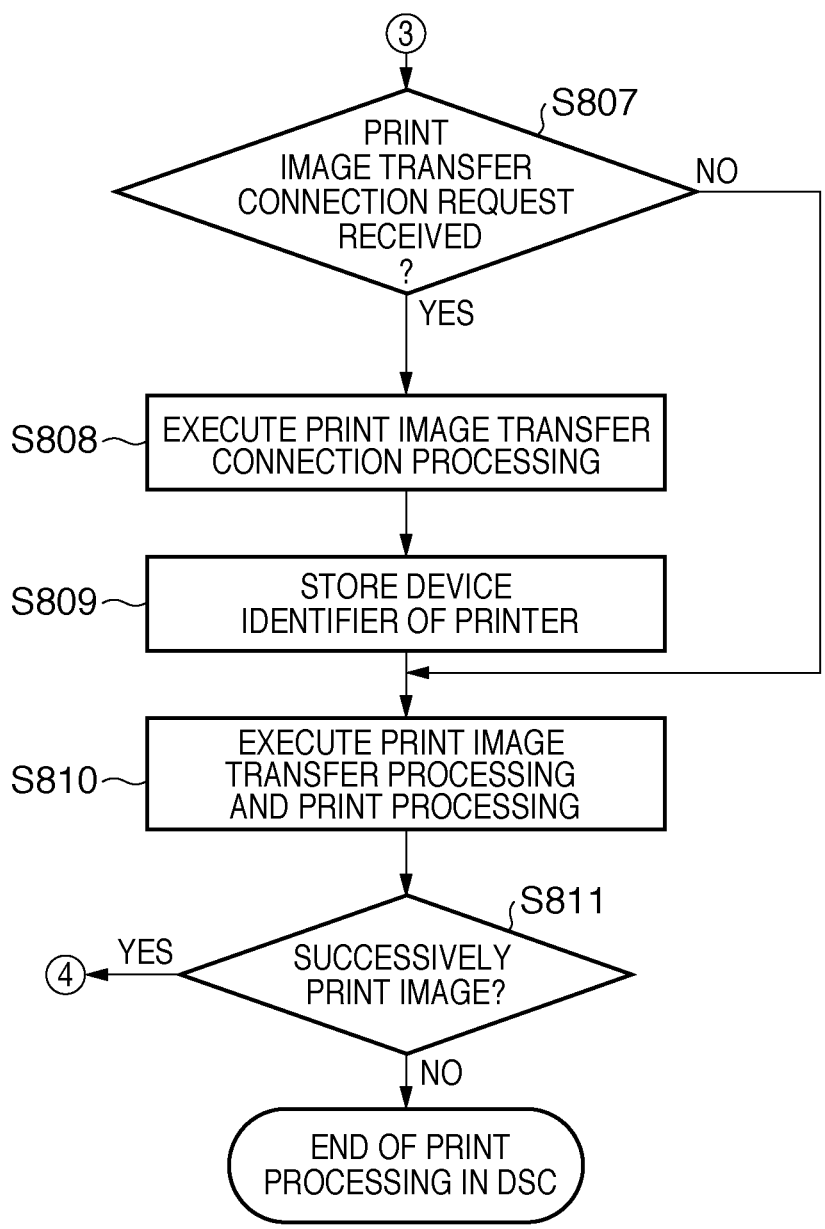
Figure 9:
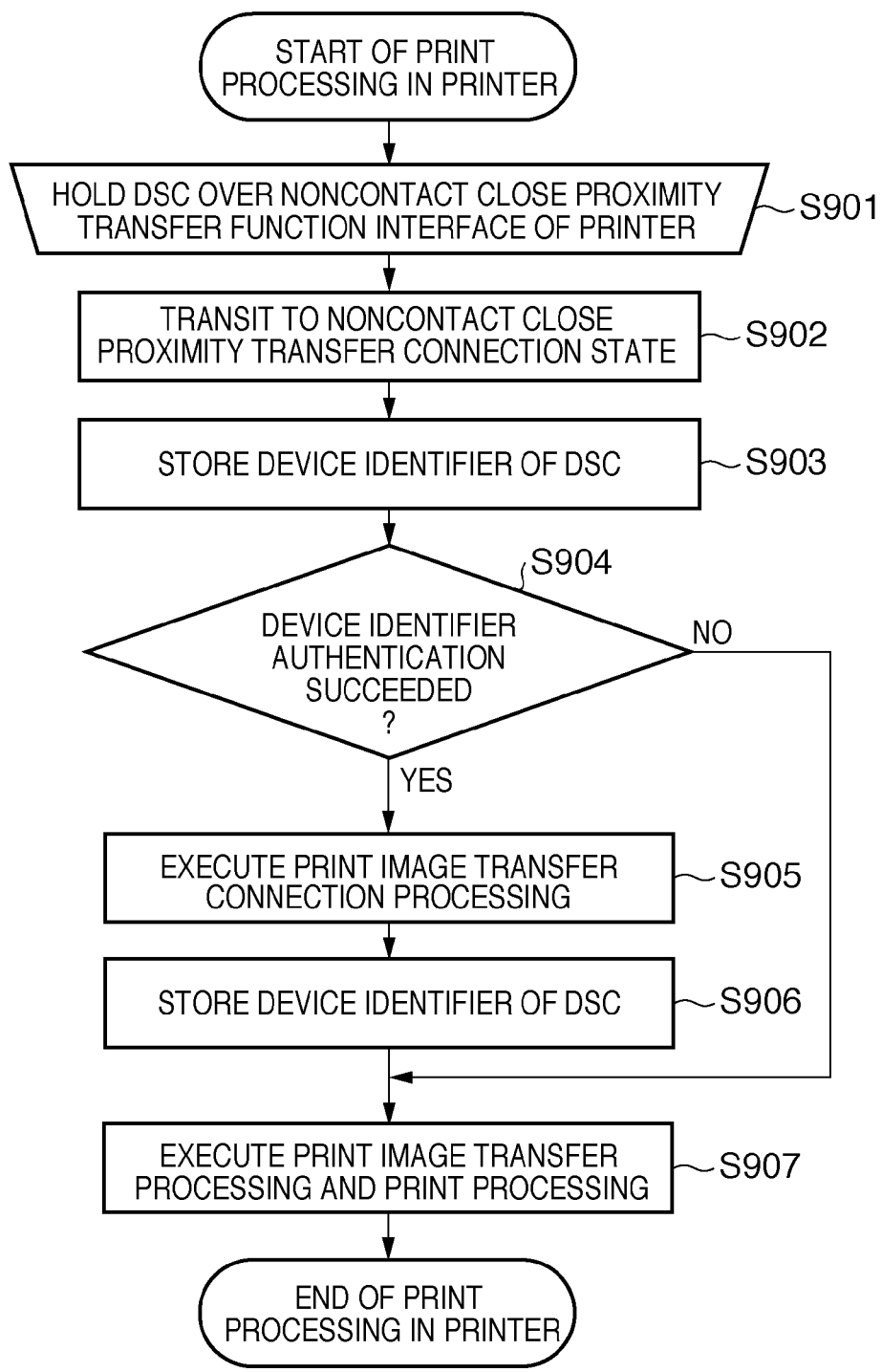
FIG. 9 is a flowchart showing a processing sequence in a printer 102 when executing the print processing in the communication system according to the second embodiment of the present invention.

Assume that the configuration of a communication system according to this embodiment is the same as that of the communication system in the above first embodiment. The sequence of print processing in the communication system of this embodiment will be explained below with reference to FIGS. 7 to 9. FIG. 7 is a sequence chart showing the sequence of the print processing in the communication system. FIGS. 8A and 8B are flowcharts showing a processing sequence in a DSC 101 when executing the print processing in the communication system. FIG. 9 is a flowchart showing a processing sequence in a printer 102 when executing the print processing in the communication system.

When the user powers on the DSC 101 and printer 102, and inputs a print processing execution instruction either via the display device of a user interface function unit 207 or using a button dedicated to print processing, the DSC 101 accepts the instruction (step S801).

Upon accepting the print processing execution instruction in step S801, the DSC 101 starts noncontact close proximity transfer connection processing in step S802.

More specifically, a link control unit 203 issues, to a noncontact close proximity transfer function unit 201, a "first connection request" (701) to perform connection using the noncontact close proximity transfer function. Upon reception of the request, the noncontact close proximity transfer function unit 201 transmits a "noncontact close proximity connection request" (702) to the printer 102.

In this state, the user selects, from a plurality of images saved within the DSC 101, an image which he/she wants to print. The DSC 101 accepts a print image selection instruction input by the user (step S803).

Subsequently, the user holds the DSC 101 over the printer 102 so that a noncontact close proximity transfer function interface 103 comes into contact with a noncontact close proximity transfer function interface 104 or the apparatuses are located within a communicable range (steps S804 and S901).

With this operation, the printer 102 can receive the "noncontact close proximity connection request" (702) from the DSC 101.

In the printer 102, a noncontact close proximity transfer function unit 301 receives the "noncontact close proximity connection request" (702). This causes the printer 102 to transit to a noncontact close proximity transfer connection state (step S902).

More specifically, the noncontact close proximity transfer function unit 301 executes connection processing for noncontact close proximity transfer, and then transmits, to the DSC 101, a "noncontact close proximity connection response" (703) representing that the connection processing has been completed. The unit 301 also notifies, as a "first connection notification" (704), a link control unit 303 that the connection processing has been completed.

Since the printer 102 can recognize the device identifier of the DSC 101, each of the "first connection request" (701) and the "noncontact close proximity connection request" (702) contains the device identifier of the DSC 101.

When, therefore, the printer 102 receives the "noncontact close proximity connection request" (702), the link control unit 303 stores the device identifier of the DSC 101 (step S903).

Meanwhile, in the DSC 101, the noncontact close proximity transfer function unit 201 receives the "noncontact close proximity connection response" (703). The DSC 101, therefore, detects that the connection processing for noncontact close proximity transfer has been completed, and transits to a noncontact close proximity transfer connection state (step S805).

The noncontact close proximity transfer function unit 201 also transmits, to the link control unit 203, a "first connection response" (705) representing that the connection processing has been completed.

Since the DSC 101 can recognize the device identifier of the printer 102, each of the "noncontact close proximity connection response" (703) and the "first connection response" (705) contains the device identifier of the printer 102.

When, therefore, the DSC 101 receives the "noncontact close proximity connection response" (703), the link control unit 203 stores the device identifier of the printer 102 via the "first connection response" (705) (step S806). An authentication means (to be described later) uses the device identifier of the opposing apparatus, which has been stored as explained above.

Then, transmission/reception processing between the DSC 101 and the printer 102 is executed via the noncontact close proximity transfer function units 201 and 301.

The link control unit 303 of the printer 102 which has received the "first connection notification" (704) advances the process to step S904. In step S904, the link control unit 303 compares the device identifier of the DSC 101 which is contained in the "first connection notification" (704) and the device identifier of a DSC as the last connection partner which is stored in the link control unit 303.

At this stage, the printer 102 has never executed print processing of an image transferred from the DSC 101 since power on. The link control unit 303, therefore, stores no print image transfer connection identifier. For this reason, the comparison processing (authentication) fails in this case.

The link control unit 303 in which the authentication has failed grasps that connection processing by a protocol for print image transfer processing has not been performed until now.

To start the connection processing by the protocol for the print image transfer processing, the link control unit 303 of the printer 102 issues a "second connection request" (706) to a print image transfer processing unit 302.

Note that the connection processing (steps S807 and S808 and step S905; 707 to 714) by the protocol for the print image transfer processing has been described in the above first embodiment and a description thereof will be omitted here.

At this time, the DSC 101 can transfer an image to the printer 102, and cause the printer 102 to execute print processing.

When the connection processing by the protocol for the print image transfer processing completes, each of the DSC 101 and printer 102 stores, as the device identifier of the last connection partner, the device identifier stored in a corresponding one of the link control units 203 and 303 (step S809 or S906).

After that, the print image transfer processing units 202 and 302 of the DSC 101 and printer 102 execute transfer processing of a predetermined print image, and a printer function unit 305 of the printer 102 performs print processing (715; steps S810 and S907).

When the DSC 101 transfers an image to the printer 102, and the printer 102 completes print processing of the transferred image, the DSC 101 determines in step S811 whether to successively execute transfer/print processing on another image.

In this example, a case in which the DSC 101 successively executes transfer/print processing on another image (YES in step S811) will be explained.

To execute transfer/print processing on another image, the user moves the DSC 101 away from the printer 102 to select the other image in the DSC 101. At this time, the DSC 101 and printer 102 transit to a noncontact close proximity transfer disconnection state, and the noncontact close proximity transfer function units 201 and 301 transmit noncontact close proximity disconnection notifications (716 and 717) to the link control units 203 and 303, respectively.

In response to this, the link control unit 203 of the DSC 101 issues, to the noncontact close proximity transfer function unit 201, a "first connection request" (718) to perform connection using the noncontact close proximity transfer function. Upon reception of the request, the noncontact close proximity transfer function unit 201 transmits a "noncontact close proximity connection request" (719) to the printer 102.

In this state, the user selects, from the plurality of images saved within the DSC 101, another image which he/she wants to print (720; step S803).

Note that the protocol for the print image transfer processing is in a connection state at this time, and does not transit to a disconnection state.

After that, the DSC 101 and printer 102 execute the same processing as the above one (steps S804 and S805 and steps S901 to S903), thereby transiting to a noncontact close proximity transfer connection state.

With this processing, the noncontact close proximity transfer function unit 301 notifies, as a "first connection notification" (723), the link control unit 303 that the connection processing has been completed. The noncontact close proximity transfer function unit 201 transmits, to the link control unit 203, a "first connection response" (722) representing that the connection processing has been completed.

Then, transmission/reception processing between the DSC 101 and the printer 102 is executed via the noncontact close proximity transfer function units 201 and 301.

The link control unit 303 of the printer 102 which has received the "first connection notification" (723) advances the process to step S904. In step S904, the link control unit 303 compares the device identifier of the DSC 101 which is contained in the "first connection notification" (723) and the device identifier of a DSC as the last connection partner which is stored in the link control unit 303.

At this time, the link control unit 303 of the printer 102 has stored the device identifier of the DSC 101 as the opposing device. It is, therefore, determined in step S904 that the comparison processing (authentication) of the device identifiers has succeeded. The link control unit 303 in which the comparison processing (authentication) has succeeded grasps that the DSC 101 and printer 102 are in a connection state in the protocol for the print image transfer processing.

The link control unit 303 of the printer 102, therefore, need not start the connection processing by the protocol for the print image transfer processing.

The DSC 101 can transfer an image to the printer 102, and cause the printer 102 to execute print processing. Therefore, the print image transfer processing units 202 and 302 of the DSC 101 and printer 102 execute transfer processing of a predetermined print image, and a printer function unit 305 of the printer 102 performs print processing (724; steps S810 and S907).

Although the printer 102 executes the device identifier authentication in the above explanation, the present invention is not limited to this. The DSC 101 may perform the authentication.

Only the device identifier authentication is done in the above description but the present invention is not limited to this. It is possible to obtain the same effects even if only the print image transfer connection identifier authentication is executed.

As is apparent from the above explanation, in the DSC and printer according to this embodiment, when the print image transfer protocol is in a connection state, and the noncontact close proximity transfer unit enters a disconnection state, the print image transfer protocol does not transit to a disconnection state.

For this reason, if the noncontact close proximity transfer unit enters a connection state, it is possible to immediately execute transfer/print processing since authentication can be done by using the already stored print image transfer connection identifier.

That is, the execution time of reconnection processing by the print image transfer protocol is saved to shorten a print processing time, thereby improving user operability.

Although a case in which the present invention is applied to noncontact close proximity transfer has been explained in this embodiment, the present invention is not limited to this. For example, it can be expected to obtain the same effects even if the present invention is applied to another wireless communication such as a wireless LAN.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a computer-readable storage medium which records software program codes for implementing the functions of the above-described embodiments is supplied to a system or apparatus. The above functions are implemented when the computer (or the CPU or MPU) of the system or apparatus reads out and executes the program codes stored in the storage medium. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes based on the instructions of the program codes.

Furthermore, the present invention includes a case in which, after the program codes read out from the storage medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes based on the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171244 filed on Jun. 30, 2008, which is hereby incorporated by reference herein in its entirety.

The invention claimed is:

1. A communication apparatus comprising:
 a wireless communication unit configured to wirelessly communicate with a partner communication apparatus;
 a selection unit configured to select an image;
 an execution unit configured to execute a communication connection process for transmission of an image from the communication apparatus to the partner communication apparatus in a case where the wireless communication unit has established a connection to the partner communication apparatus in accordance with a first communication protocol while a first image has been selected by the selection unit, wherein the communication connection process is a process in accordance with a second communication protocol, which is different from the first communication protocol; and
 a transmission unit configured to transmit an image from the communication apparatus to the partner communication apparatus using the second communication protocol;
 wherein the transmission unit starts transmission of a second image, which is different from the first image, without executing again the communication connection process in accordance with the second communication protocol, in a case where the wireless communication unit has established a connection to the partner communication apparatus in accordance with the first communication protocol while the second image has been selected by the selection unit after transmission of the first image by the transmission unit was started and a connection with the partner communication apparatus by the wireless communication unit was disconnected.

2. The communication apparatus according to claim 1, further comprising
 a storage unit configured to store device identification information of the partner communication apparatus, in a case where the wireless communication unit has established a connection to the partner communication apparatus; and
 a confirming unit configured to confirm that the communication connection process with the partner communication has been completed using the device identification information of the partner communication apparatus, in a case where the wireless communication unit has established a connection to the partner communication apparatus,
 wherein the communication connection process is executed in a case where it is confirmed from the confirmation result by the confirming unit that the communication connection process has not been completed.

3. The communication apparatus according to claim 1, wherein the communication apparatus starts a process for establishing connection by the wireless communication unit, in a case where the communication apparatus is instructed to perform an image output process, or in a case where a connection with the partner communication apparatus by the wireless communication unit is disconnected.

4. The communication apparatus according to claim 2, further comprising a determination unit configured to determine whether to continue a communication with the partner communication apparatus, wherein the confirmation unit is configured to confirm that the communication connection process with the partner communication has been completed after the determination unit determines to continue the communication in the second communication layer.

5. The communication apparatus according to claim 4, wherein the storage unit deletes the device identification information of the other communication apparatus, in a case where the determination unit does not determine to continue the communication with the partner communication apparatus.

6. The communication apparatus according to claim 2, wherein the storage unit deletes the device identification information of the partner communication apparatus, in a case where a predetermined instruction is input to the communication apparatus.

7. The communication apparatus according to claim 1, wherein wireless communication by the wireless communication unit is performed by NFC (near field communication).

8. A communication system comprising a first communication apparatus and a second communication apparatus, wherein the first communication apparatus comprises:
 a wireless communication unit configured to wirelessly communicate with the second communication apparatus;
 a selection unit configured to select an image;
 an execution unit configured to execute a communication connection process for transmission of an image from the communication apparatus to the second communication apparatus in a case where the wireless communication unit has established a connection to the second communication apparatus in accordance with a first communication protocol while a first image has been selected by the selection unit, wherein the communication connection process is a process in accordance with a second communication protocol, which is different from the first communication protocol; and a transmission unit configured to transmit an image from the first communication apparatus to the second communication apparatus using the second communication protocol;

wherein the transmission unit starts transmission of a second image, which is different from the first image, without executing again the communication connection process in accordance with the second communication protocol, in a case where the wireless communication unit has established a connection to the second communication apparatus in accordance with the first communication protocol while the second image has been selected by the selection unit after transmission of the first image by the transmission unit was started and a connection with the second communication apparatus by the wireless communication unit was disconnected.

9. A control method performed by a communication apparatus comprising a wireless communication unit configured to wirelessly communicate with a partner communication apparatus, the method comprising steps of:

selecting an image;

executing a communication connection process for transmission of an image from the communication apparatus to the partner communication apparatus in a case where the wireless communication unit has established a connection to the partner communication apparatus in accordance with a first communication protocol while a first image has been selected, wherein the communication connection process is a process in accordance with a second communication protocol, which is different from the first communication protocol; and transmitting an image from the communication apparatus to the partner communication apparatus using the second communication protocol;

wherein the communication apparatus starts transmission of a second image, which is different from the first image, without executing again the communication connection process in accordance with the second communication protocol, in a case where the wireless communication unit has established a connection to the partner communication apparatus in accordance with the first communication protocol while the second image has been selected after transmission of the first image was started and a connection with the partner communication apparatus by the wireless communication unit was disconnected.

10. A non-transitory computer-readable storage medium storing a computer-executable program that, when executed by a computer, causes the computer to perform the method according to claim 9.

11. The communication apparatus according to claim 2, wherein the storage unit further stores an identifier regarding a communication for an image, and the confirming unit is configured to confirm that the communication connection process has been completed using the identifier regarding the communication for an image.

12. The communication apparatus according to claim 1,
wherein the selection unit selects an image to be printed,
wherein the partner communication apparatus is a printer, and
wherein the communication apparatus performs communication of the first image and the second image for causing the partner communication apparatus to print the first image and the second image.

13. The communication apparatus according to claim 1, further comprising a holding unit configured to hold a plurality of images, which includes the first image and the second image,
wherein the selection unit selects an image from among the plurality of images held by the holding unit, and
wherein the transmission unit transmits an image included in the plurality of images held by the holding unit.

14. The communication apparatus according to claim 1, wherein, in a case where transmission of the first image by the transmission unit was started and a connection with the partner communication apparatus by the wireless communication unit was disconnected, the communication apparatus does not disconnect a connection with the partner communication apparatus in accordance with the second communication protocol, which has been established by the communication connection process.

* * * * *